US006720683B2

(12) United States Patent
Bundschu et al.

(10) Patent No.: US 6,720,683 B2
(45) Date of Patent: Apr. 13, 2004

(54) MACHINE TOOL WITH A LINEAR DRIVE FOR MACHINING ELEMENT

(75) Inventors: Stephan Bundschu, Stuttgart (DE); Jochen Feilhauer, Ditzingen (DE)

(73) Assignee: Trumpf Werkzeugmaschinen GmbH & Co. KG, Ditzingen (DE)

( * ) Notice: Subject to any disclaimer, the term of this patent is extended or adjusted under 35 U.S.C. 154(b) by 0 days.

(21) Appl. No.: 10/222,115

(22) Filed: Aug. 16, 2002

(65) Prior Publication Data

US 2003/0034696 A1 Feb. 20, 2003

(30) Foreign Application Priority Data

Aug. 18, 2001 (EP) ........................................... 01119999

(51) Int. Cl.[7] ........................... H02K 41/00; B23K 7/10
(52) U.S. Cl. .............................. 310/12; 266/69; 266/77
(58) Field of Search .............................. 266/48, 69, 77; 310/12, 13, 14

(56) References Cited

U.S. PATENT DOCUMENTS

| | | | | |
|---|---|---|---|---|
| 3,851,196 A | | 11/1974 | Hinds | 310/12 |
| 3,904,900 A | | 9/1975 | Shichida et al. | 310/12 |
| 4,469,311 A | * | 9/1984 | Laing | 266/67 |
| 4,744,442 A | | 5/1988 | Bras et al. | 184/39 |
| 5,763,965 A | * | 6/1998 | Bader | 310/12 |
| 5,782,445 A | * | 7/1998 | Cleek | 248/206.5 |
| 5,789,892 A | | 8/1998 | Kitai et al. | 318/687 |
| 5,862,887 A | * | 1/1999 | Swaybill et al. | 187/313 |
| 5,945,747 A | | 8/1999 | Neff et al. | 310/12 |
| 6,130,490 A | | 10/2000 | Lee | 310/12 |
| 6,372,179 B1 | * | 4/2002 | Marcato | 266/69 |

FOREIGN PATENT DOCUMENTS

| | | |
|---|---|---|
| DE | 3534214 | 4/1986 |
| DE | 9218604 | 11/1994 |
| EP | 0871284 A2 | 10/1998 |
| GB | 1367808 A | 9/1974 |

OTHER PUBLICATIONS

TRUMATIC HSL 2502 C German Catalog—Apr. 2001 By Trumpf.

Trumpf TRUMATIC HSL2502C/4002C High–Speed Laser Cutting Centers with Two $CO_2$ Lasers Brochure.

* cited by examiner

*Primary Examiner*—Burton S. Mullins
*Assistant Examiner*—Judson H. Jones

(57) ABSTRACT

A machine tool has an operating unit that can be moved by at least one linear motor (24) along a first guide structure in the direction of a first axis of travel (z-axis) and by at least one second linear motor (21, 22) jointly with the first guide structure along a second guide structure in the direction of a second axis of travel (y-axis). Each linear motor (21, 22, 24) includes primary elements as well as secondary elements (15/1, 17; 15/2, 17; 23). The secondary element(s) (23) associated with the first axis of travel (z-axis) is/are operatively connected to the operating unit; the secondary element (s) (15/1, 17; 15/2, 17) associated with the second axis of travel (y-axis) is/are operatively connected to the second guide structure; and the primary elements associated with the different axes of travel (y-axis, z-axis) are operatively connected to the first guide structure and are positioned between the secondary elements (23) associated with the first axis of travel (z-axis) and the secondary elements (15/1, 17; 15/2, 17) associated with the second axis of travel (y-axis). The primary elements associated with the different axes of travel (y-axis, z-axis) are arranged in a linear side-by-side array in the direction of one axis of travel (y-axis) while mutually overlapping in the direction of the other axis of travel (z-axis).

7 Claims, 9 Drawing Sheets

1
2
3
4
5
6/13
7
8
9
10
11
12
14
15/1
15/2
x
y
z

15/2
16
17
14
18
18/2
y
z
22
24
18/3
25
23
31
27
29
35
28
34
30
26
32
33
18/1
21
15/1

18
18/1
18/3
18/2
offset
overlap

18/2
18
18/3
20
18/1

18
18/1
19/1
18/3
18/2
19/2

15/2
17
18
38
41
38
37
23
41
36
38
38
41
39
40
15/1
y
z 5
13
38
37
38
23
18
17
39
15/1
40
z
y

MACHINE TOOL WITH A LINEAR DRIVE FOR MACHINING ELEMENT

BACKGROUND OF THE INVENTION

This invention relates to a machine tool incorporating an operating unit which is movable by means of at least one first linear motor along a first guide structure in the direction of a first axis of travel and along a second guide structure in the direction of a second axis of travel by means of at least one second linear motor, jointly with said first guide structure. Each linear motor features a primary element and a secondary element.

A machine tool of this type, model TRUMATIC® HSL 2502 C, is currently being marketed by the Trumpf GmbH & Co., of 71254 Ditzingen, Germany. The functional or operating unit of that machine is in the form of a laser cutting head which, driven by linear motors, moves in a horizontal x-y plane. The first guide structure is a bridge that extends in the x-direction and guides the laser cutting head in the x-direction. A second guide structure is provided by the machine frame that carries the bridge with the laser cutting head on support beams and allows the bridge to travel in the y-direction. Linear motors, each with a primary element and a secondary element, serve to move the laser cutting head on the bridge and to move the laser cutting head and bridge assembly along the support beams of the machine frame. The secondary motor elements associated with the y-axis are attached to the support beams of the machine frame while their matching primary motor elements are attached to the bridge. Also connected to the bridge is the secondary element of the linear motor that drives the laser cutting head in the x-direction. The primary motor element operating in the x-direction is attached to the laser cutting head.

German Patent A-35 34 214 describes an x-y table encompassing as its operating unit a platform that is supported on a base by an intermediate carriage. Linear motors with primary and secondary elements move the platform on the intermediate carriage along the y-axis and the platform and carriage combination on the base in the x-direction. The primary motor elements controlling the movement along the different coordinates are attached to the top surface of the carriage facing the platform and, respectively, to the bottom surface of the carriage facing the base opposite the primary elements. Correspondingly, the primary motor elements for the different axes of travel of the platform are vertically separated by the body of the intermediate carriage. As a result, the overall height of that earlier design of an x-y table is rather considerable.

U.S. Pat. No. 6,130,490 discloses an x-y table in which the primary elements of the linear motors operating in different axes of travel are positioned in one common plane. That x-y table, however, does not encompass an intermediate structure comparable to the first guide structure in machine tools of the category here addressed. Moreover, in that prior art x-y table, the primary motor elements controlling the different axes of travel are positioned at a distance from one another along each axis of travel, resulting in an expansive overall design.

It is the objective of this invention to provide a corresponding machine tool with a compact configuration of a linear motor operated direct drive for at least one operating unit of the machine.

SUMMARY OF THE INVENTION

It has now been found that the foregoing and related objects may be readily attained in a machine tool with an operating unit that can be moved by a first linear motor along a first guide structure in the direction of a first axis of travel (z-axis) and by at least one second linear motor jointly with the first guide structure along a second guide structure in the direction of a second axis of travel (y-axis). Each linear motor includes a primary element and a secondary element. The secondary elements associated with the first axis of travel (z-axis) are operatively connected to the operating unit, and the secondary elements associated with the second axis of travel (y-axis) are operatively connected to the second guide structure. The primary elements associated with the different axes of travel (y-axis, z-axis) are operatively connected to the first guide structure and are positioned between the secondary elements associated with the first axis of travel (z-axis), The secondary elements associated with the second axis of travel (y-axis), and the primary elements (19/1, 19/2, 20) associated with the different axes of travel (y-axis, z-axis) are arranged in a linear side-by-side array in the direction of one axis of travel (y-axis) while mutually overlapping in the direction of the other axis of travel (z-axis).

The side-by-side arrangement makes it possible to position the primary elements associated with the different axes of travel in a direction perpendicular to the operating plane defined by the axes of travel of the operating unit, thus minimizing the system's overall height. The overlapping of the primary elements along the respective axis of travel has a corresponding effect. As an added benefit of the compact design of the direct linear drive for the operating unit of machine tools per this invention, the mass that must be moved in the operation of the machine tool is minimized. That in turn allows for extraordinarily high travel speeds of the operating unit without compromising its positional accuracy. Machine tools built in accordance with this invention thus permit precise machining with extremely short processing cycles.

Preferably, the primary elements associated with the different axes of travel (y-axis, z-axis) overlap in full mutual superposition in the direction of the first axis of travel (z-axis). As a result, the space taken by the primary elements for the different axes of travel is minimized in the direction of the axis of travel in which they overlap.

Desirably, the primary elements associated with the different axes of travel (y-axis, z-axis) are arranged in a linear side-by-side array in the direction of the second axis of travel (y-axis) while mutually overlapping in the direction of the first axis of travel (z-axis).

The practicality of this configuration manifests itself by virtue in that, in the direction of the second axis of travel, it is the primary elements and, in the direction of the first axis of travel, it is at least one secondary element, i.e., at least one secondary element operatively connected to the operating unit, that are to be moved. The operating principle is that the movement of primary elements should always cover the longer travel paths while the movement of secondary elements should be limited to the shorter travel paths. The dimensions of the primary elements in the direction of the first axis of travel are particularly small, and this makes it possible to efficaciously guide the primary elements in the direction of the second axis of travel by means of a second guide structure that is also relatively small in the direction of the first axis of travel. It follows that the second guide structure extending in the direction of the second or "long" axis of travel can be slim in design.

The primary elements associated with the different axes of travel (y-axis, z-axis) mutually overlap in a direction perpendicular to the operating plane defined by the axes of travel (y-axis, z-axis) of the operating unit. The primary elements associated with the different axes of travel (y-axis, z-axis) are mutually offset in the direction perpendicular to the operating plane defined by the axes of travel (y-axis, z-axis) of the operating unit, while the primary elements associated with an axis of travel (y-axis, z-axis) opposite the other primary elements are so positioned as to face the matching secondary elements.

This geometric offset creates a relatively large distance between the primary elements controlling one of the axes of travel and the secondary elements associated with the respective other axis of travel. This eliminates possible interference, for instance by eddy currents, that might obstruct the movement of the operating unit or the joint movement of the operating unit and a first guide structure along the different axes of travel.

The joint movement of the operating unit and the first guide structure in the direction of the second axis of travel (y-axis) is provided by an even number of multiple linear motors. In the direction of the axis of travel concerned (y-axis), the primary elements of these linear motors are evenly distributed on both sides of the primary elements associated with the first axis of travel (z-axis).

Thus, the primary elements associated with the second axis of travel are driven in symmetry with the primary elements for the first axis of travel.

Each of the primary elements associated with the different axes of travel (y-axis, z-axis) is provided with a partial housing compartment. These housing compartments together form a modular primary element housing which is equipped with at least one common port shared by several primary elements and accommodating at least one external power supply cable, the leads of at least one external monitoring circuit and the leads of at least one external control circuit.

By positioning the primary elements associated with the different axes of travel in close mutual proximity, they can be jointly accommodated in a common primary element housing. The housing for the primary elements has at least one common input and/or output port from/to external lines and the number of external primary element input and output cables that travel along with the movement of the operating unit is reduced to a minimum. The housing compartments that make up the housing for the primary elements, like the primary elements themselves, may be mutually positioned for instance side by side or overlapping in one or several directions. Claim 8 describes practical ways in which common connections can be provided for the primary elements.

The primary element housing may also accommodate at least one coolant feed line, and the leads of at least one temperature monitoring circuit.

BRIEF DESCRIPTION OF DRAWINGS

The following specification describes this invention in more detail on the basis of a design example and with reference to diagrammatic illustrations in which.

DETAILED DESCRIPTION OF THE PREFERRED EMBODIMENT

Figure 1:
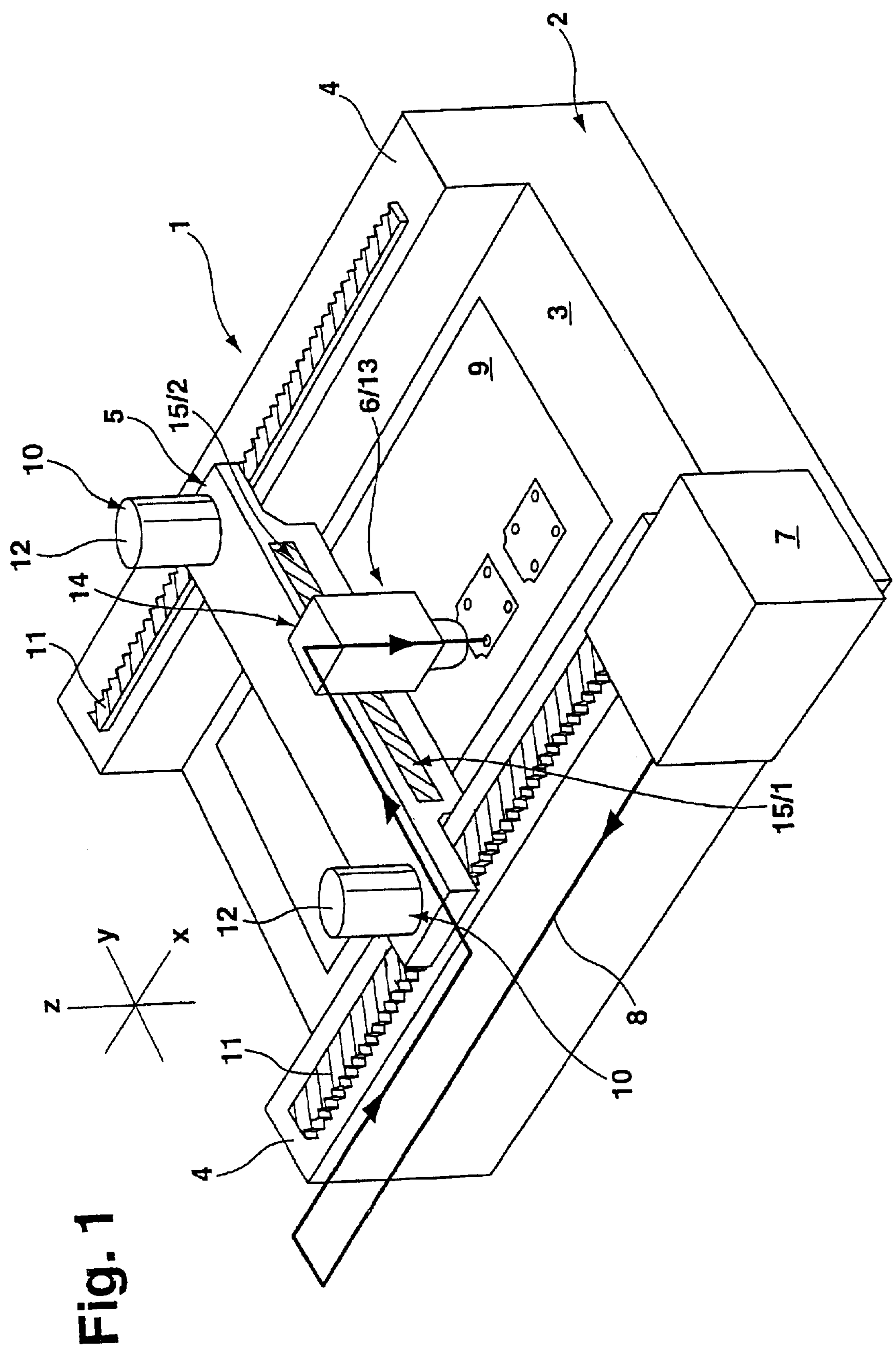
FIG. 1 is a diagrammatic perspective view of a laser cutting machine in which a bridge carries a laser cutting head moved by a direct drive linear motor system.

As indicated in FIG. 1, a machine tool in the form of a laser cutting machine 1 encompasses a machine bed 2 with a workpiece support 3 and, flanking it on both sides, longitudinal beams 4. Movably supported on the beams 4 is a bridge 5 with a laser cutting head 6 which is connected by a beam guide (not illustrated) to a laser resonator 7 which is mounted on the machine bed 2 and serves to generate a laser beam 8.

A workpiece, in this case a metal plate 9, is placed on the workpiece support 3. For the machining process, e.g. for producing contoured cutouts, the laser cutting head 6 moves above it. To do so, the bridge 5 can travel along the longitudinal beams 4 of the machine bed 2 in the direction of a horizontal x-axis. The traversing mechanism in the direction of the x-axis includes two rack and pinion drives 10 whose racks 11 are attached to the longitudinal beams 4 and mesh with the pinions driven by electric motors 12 mounted on the bridge 5.

On the bridge 5 a carriage 13, (best seen in FIGS. 8 and 9), supports the laser cutting head 6 and is movable in the direction of a horizontal y-axis. The latter extends at a right angle to the x-axis together with which it defines a horizontal x-y plane for the movement of the laser cutting head 6.

The laser cutting head 6 proper can be moved on the directional carriage 13 along a vertical z-axis. The x-axis, y-axis and z-axis together define a vertical plane for the movement of the laser cutting head 6.

The directional carriage 13 constitutes a first guide structure along which the laser cutting head 6 can move in the direction of a first axis of travel, that being the z-axis. The bridge 5 serves as a second guide structure along which the laser cutting head 6, jointly with the first guide structure (i.e. the directional carriage 13), can be moved in the direction of a second axis of travel, that being the y-axis. The laser cutting head 6 is the operating unit of the laser cutting machine 1.

The movement of the laser cutting head 6 in its vertical y-z plane is produced by a linear direct drive system 14, described in detail further below, whose linear permanent magnet array 15/1, 15/2 on the bridge 5 is schematically outlined in FIG. 1.

Figure 2:
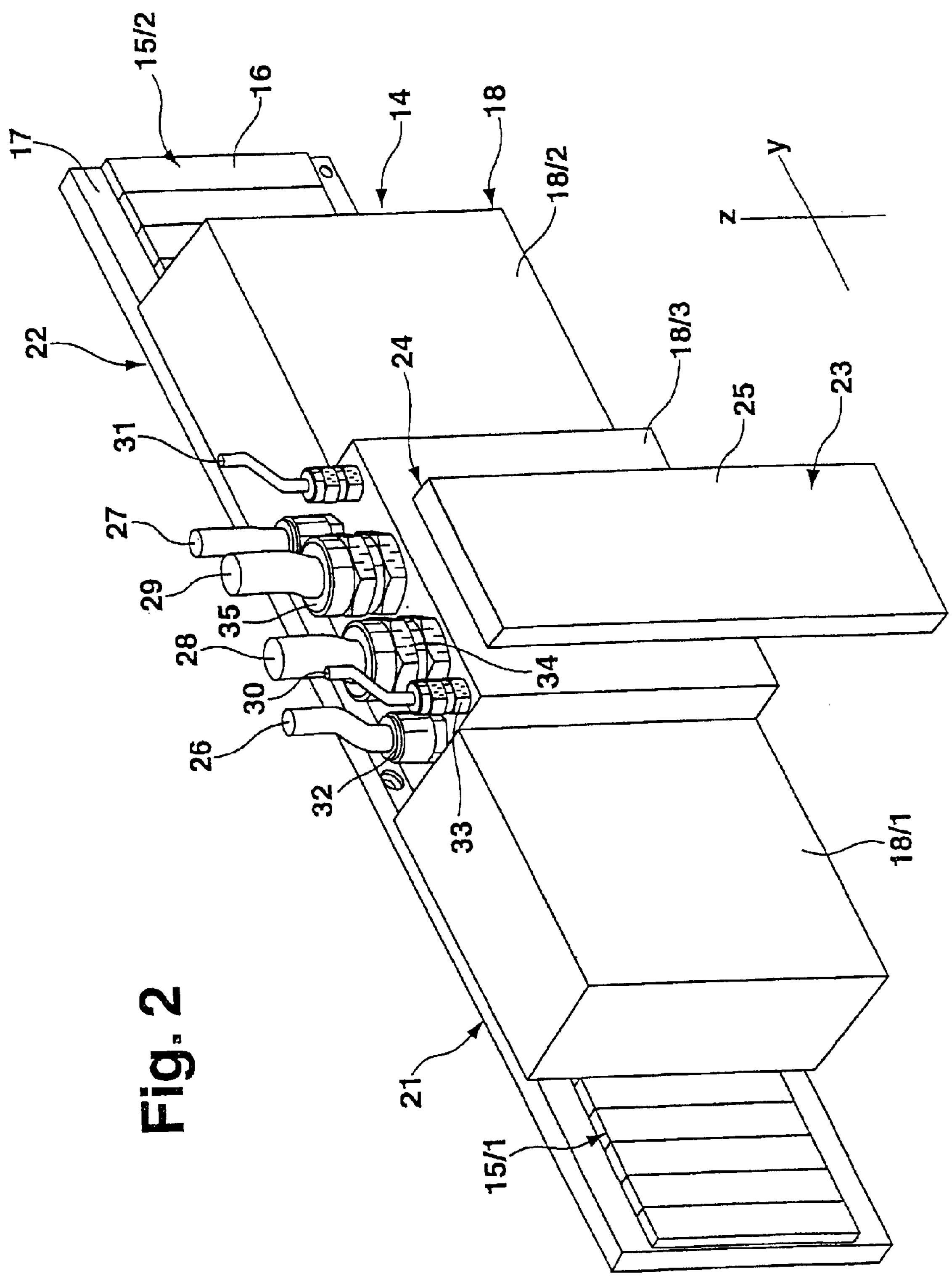
FIG. 2 is an enlarged perspective of the components of the linear direct drive system of the machine in FIG. 1.

As shown in FIG. 2, the linear array 15/1, 15/2 consists of multiple permanent magnets 16 arranged in a side-by-side configuration in the direction of the y-axis. Together with a support plate 17, the arrays 15/1, 15/2 of permanent magnets 16 constitute secondary elements of a conventional design. The permanent magnets 16 are secured to the bridge 5 by the support plate 17. For clarity's sake, only some of the permanent magnets 16 are depicted in FIG. 2.

Figure 3:
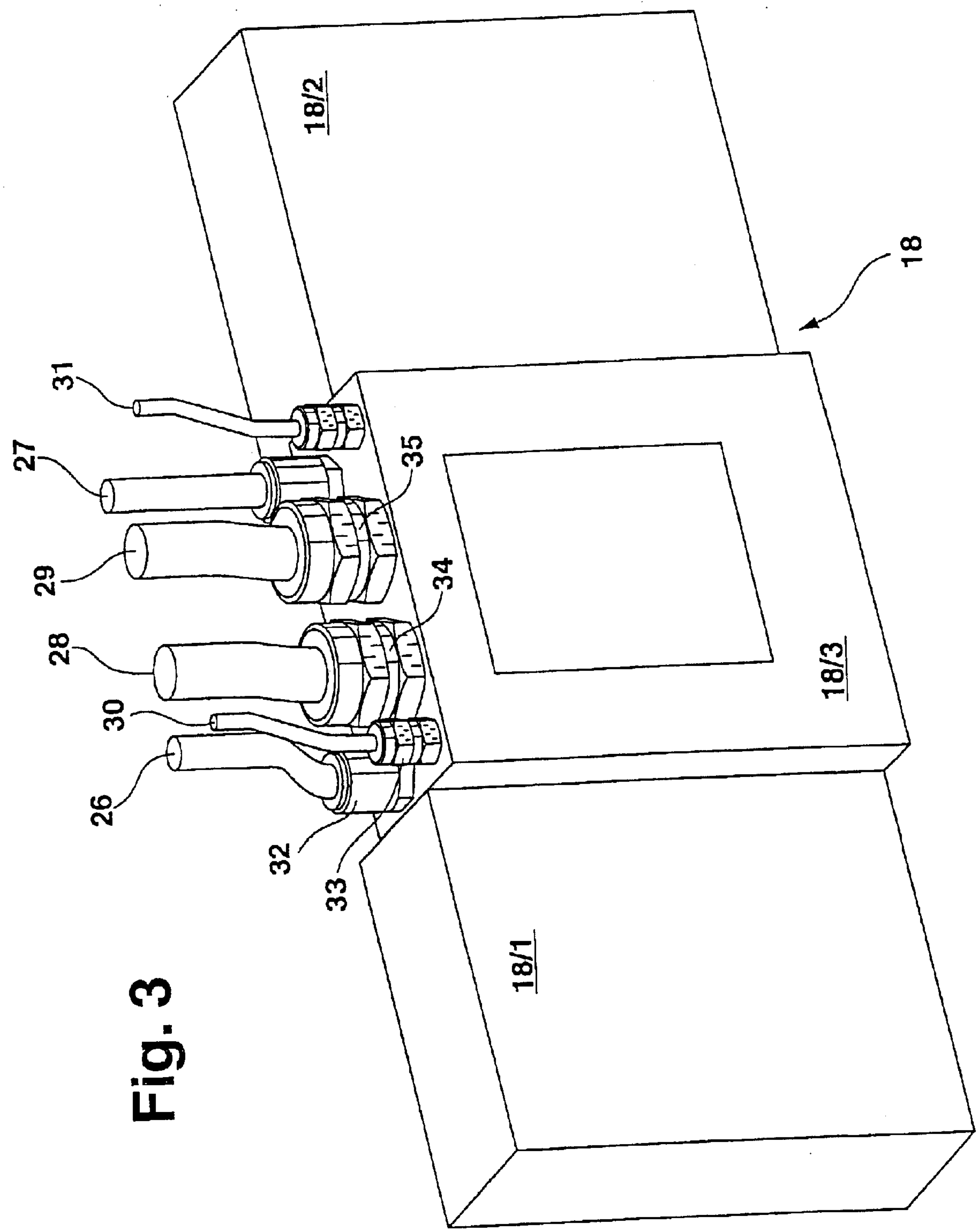
FIGS. 3 and 4 are front and rear perspective views of the primary elements of the linear direct drive system in FIGS. 1 and 2.
Figure 4:
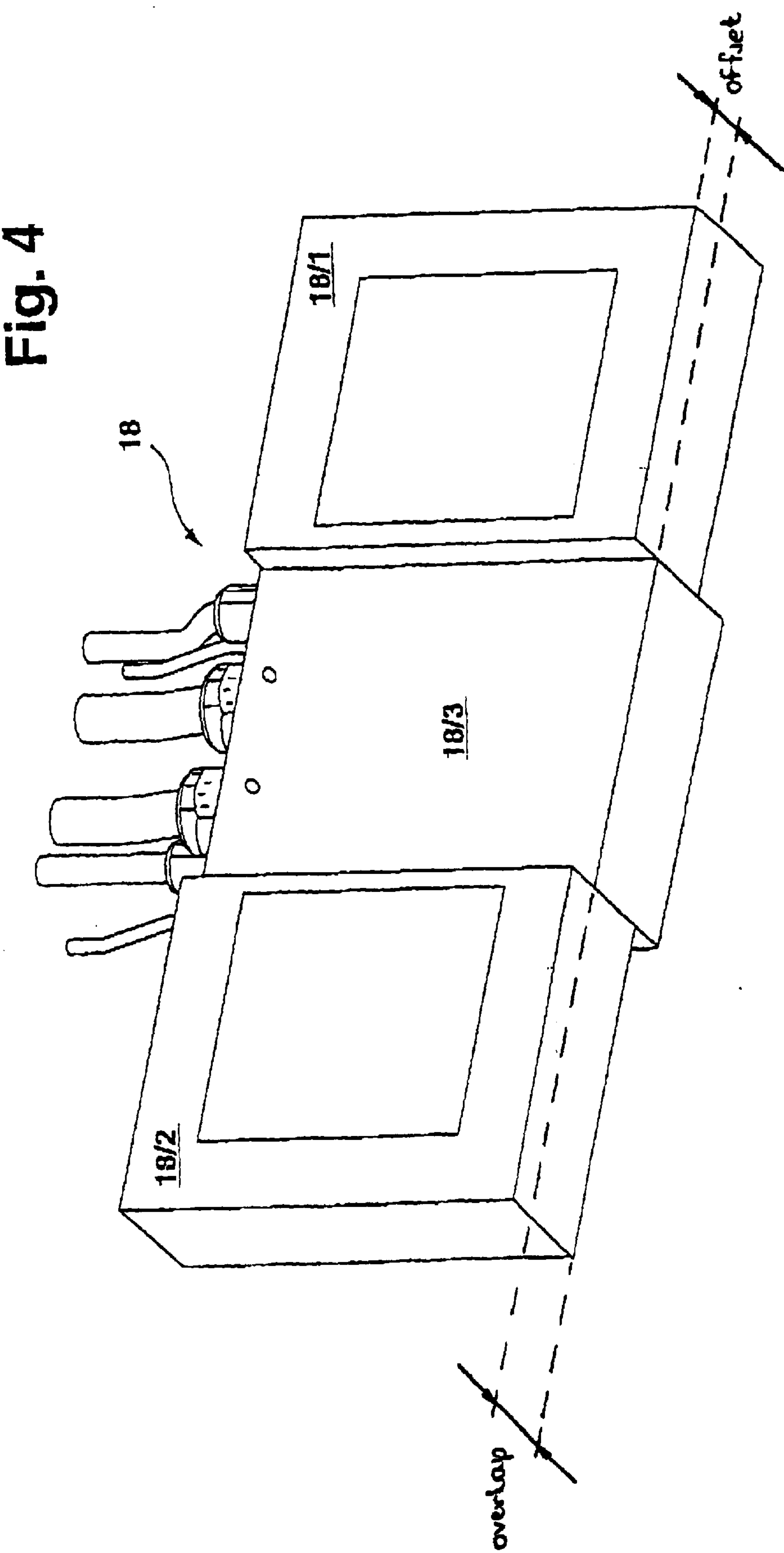
Figure 5:
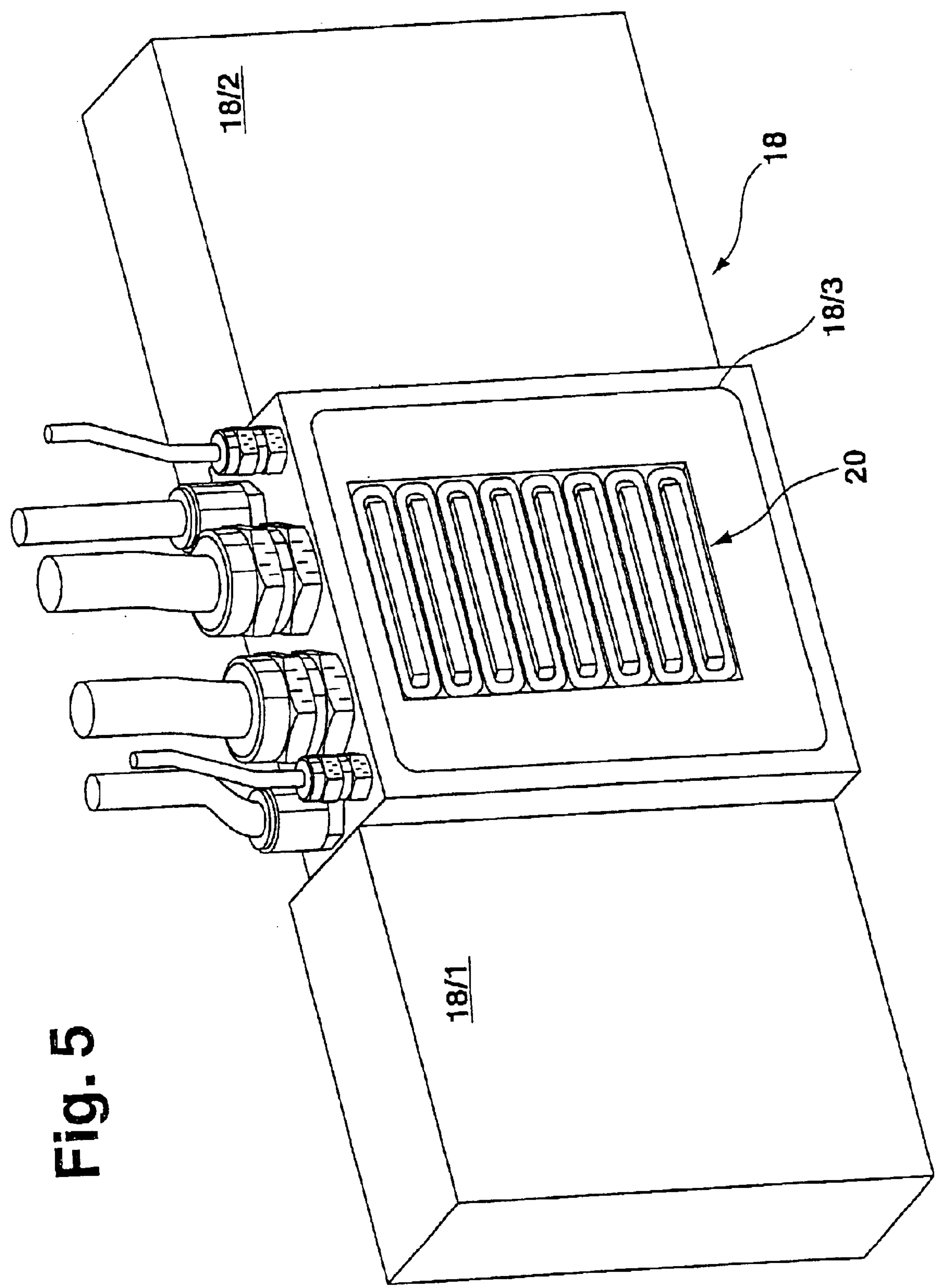
FIGS. 5 and 6 are two perspective views corresponding to FIGS. 3 and 4 with the covers removed to show internal construction.
Figure 6:
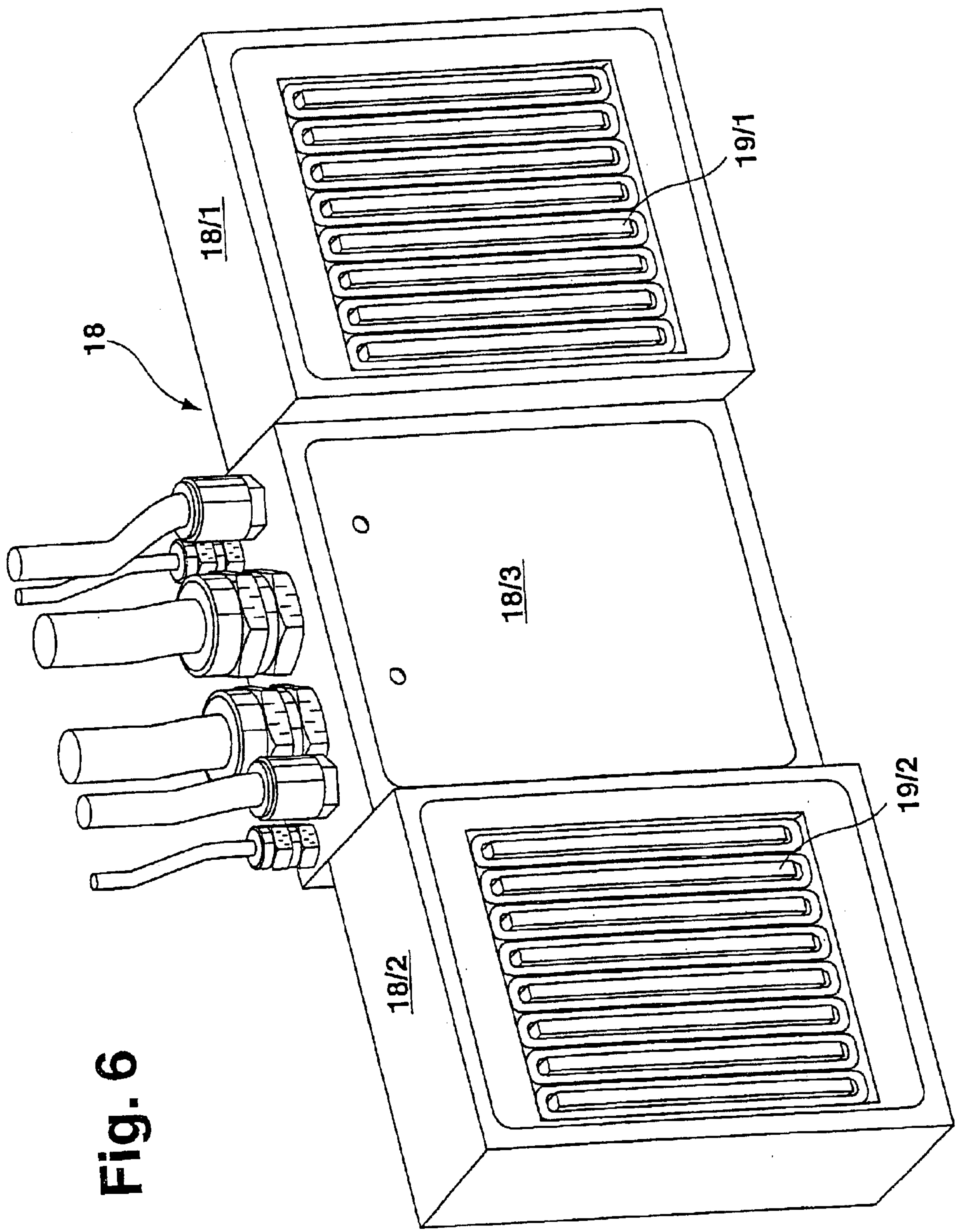

Positioned opposite the secondary elements 15/1, 17; 15/2, 17 is a primary element housing 18 consisting of modular, interconnected compartments 18/1, 18/2, 18/3 that house the primary elements 19/1, 19/2, 20 (best seen in FIGS. 5 and 6). These are the usual iron cores with coils. In FIGS. 3 and 4, the framed "active surfaces" of the compartments 18/1, 18/2, 18/3 are the housing surfaces behind which the primary elements 19/1, 19/2, 20 are located.

The primary element 19/1, jointly with the secondary element 15/1, 17, makes up a linear motor 21. The primary element 19/2, jointly with the secondary element 15/2, 17, makes up the linear motor 22. The primary element 20, jointly with its associated secondary element 23, constitutes linear motor 24. In the direction of the z-axis the secondary element 23 includes a linear array of permanent magnets, concealed in the illustrations, as well as a support plate 25. The primary elements 19/1, 19/2, 20 are connected to the directional carriage 13 by the primary element housing 18.

Both the primary elements 19/1 and 19/2 are rotated by 90° relative to the primary element 20. It is this orientation of the primary elements 19/1, 19/2, 20 and the corresponding orientation of the associated secondary elements 15/1, 17; 15/2, 17; 23 which enables the linear motors 21, 22 to drive the directional carriage 13 with the attached laser cutting head 6 in the direction of the y-axis and the linear motor 24 can drive the laser cutting head 6 on the directional carriage 13 in the direction of the z-axis.

In the interest of a compact design of the linear direct drive system 14, the primary elements 19/1, 19/2, 20 (i.e. the compartments 18/1, 18/2, 18/3 housing them) are positioned side-by-side in the direction of the y-axis and fully overlapping in the direction of the z-axis. The primary element 20 and the housing compartment 18/3 extend in the direction of the z-axis over the same distance as the primary elements 19/1, 19/2 and the housing compartments 18/1, 18/2.

When the directional carriage 13, with the laser cutting head 6 supported by it, is moved on the bridge 5 in the direction of the y-axis, the primary element 20 is moved in that same direction by the correspondingly aligned secondary elements 15/1, 17; 15/2, 17 that are matched with the primary elements 19/1, 19/2. To prevent this relative movement of the primary element 20 and secondary elements 15/1, 17; 15/2, 17 from generating eddy currents that might interfere with the movement of the directional carriage 13, the primary element 20 is spaced relative to the primary elements 19/1, 19/2, from the secondary elements 15/1, 17; 15/2, 17 in a direction perpendicular to the operating plane of the laser cutting head 6 defined by the y-axis and the z-axis. The primary element 20 and the housing compartment 18/3 and, respectively, the primary elements 19/1, 19/2 and the housing compartments 18/1, 18/2, are correspondingly offset relative to the secondary element 23. In this fashion any undesirable interaction between the permanent magnets of the secondary element 23 and the iron cores of the primary elements 19/1, 19/2 is prevented.

The primary elements 19/1, 19/2, 20 are supplied and monitored through the external electric power supply cables 26, 27, an external coolant feed line 28, an external coolant discharge line 29 as well as cables 30, 31 to external temperature monitoring circuits. To minimize the number of lines that must follow the movement of the directional carriage 13, the external power supply cable 26 and the cable 30 to the external temperature monitoring circuit connect to both the primary element 19/1 and the primary element 20. For the same reasons, the external coolant feed line 28 and the external coolant discharge line 29 carry the coolant for all primary elements 19/1, 19/2, 20. The connections to the primary elements 19/1, 20 and, respectively, to the primary elements 19/1, 19/2, 20 are made by shared ports 32, 33, 34, 35 provided on the primary element housing 18. Inside the housing the lines branch out from the common ports 32, 33, 34, 35 to the primary elements 19/1, 19/2, 20.

Figure 7:
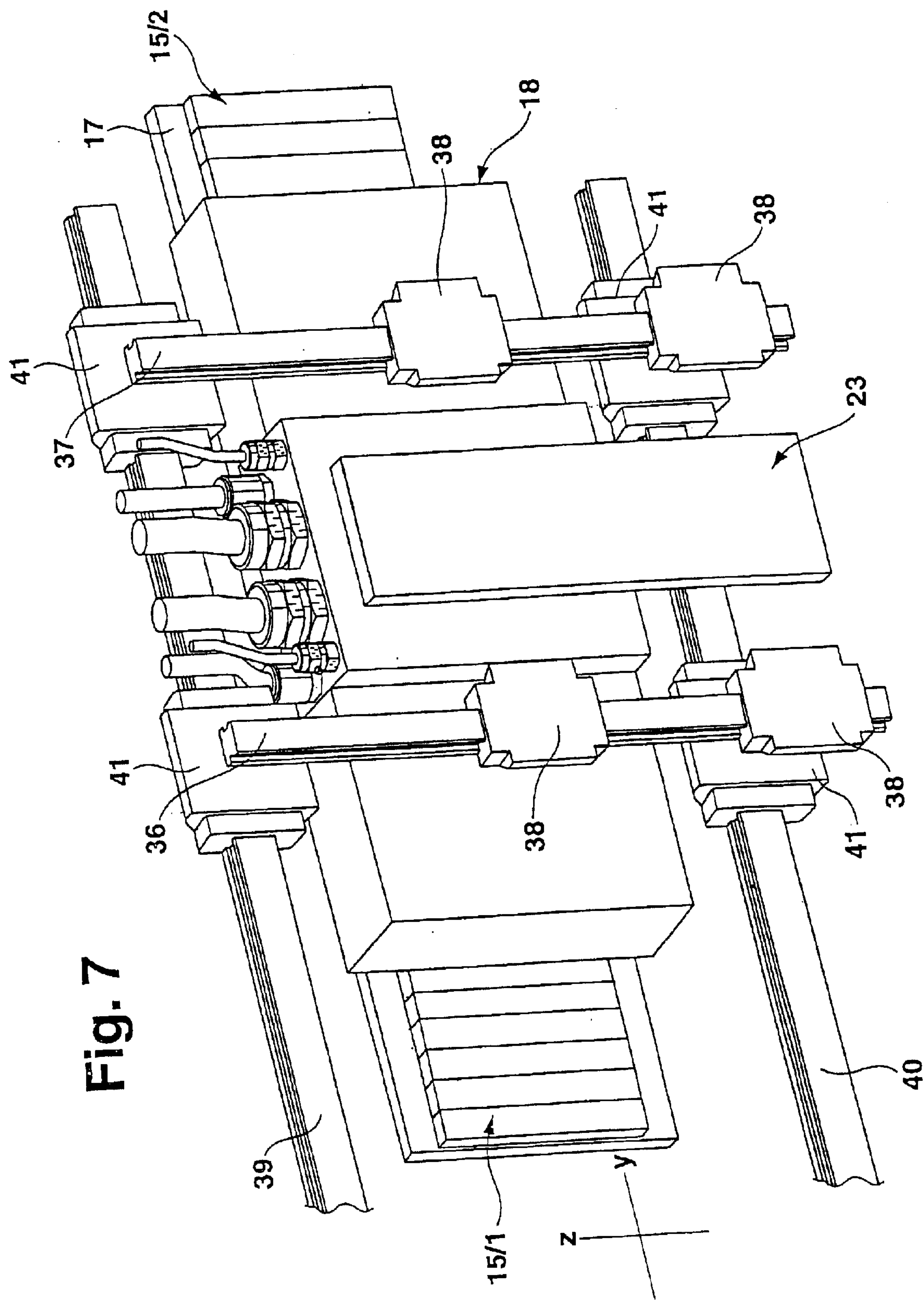
FIG. 7 is a fragmentary perspective view to an enlarged scale of the machine in FIG. 1 showing the components of the linear direct drive system together with the guide structures.

FIG. 7 depicts the components that guide the laser cutting head 6 on the carriage 13 in the direction of the z-axis, as well as the components that guide the combination of carriage 13 and laser cutting head 6 on the bridge 5 in the y-direction. Specifically, these are guide rails 36, 37 that are bolted to the directional carriage 13 and guide the linear bearings 38 to which the laser cutting head 6 is attached in the direction of the z-axis. The laser cutting head 6 is attached to the linear bearings 38 by a mounting plate, one side of which is bolted to the laser cutting head 6 while its other side is bolted to the linear bearings 38 and the support plate 25 of the secondary element 23. Guide rails 39, 40 on the bridge 5 serve to guide the linear bearings 41 and the assembly of carriage 13 and laser cutting head 6 attached to it in the direction of the y-axis.

Figure 8:
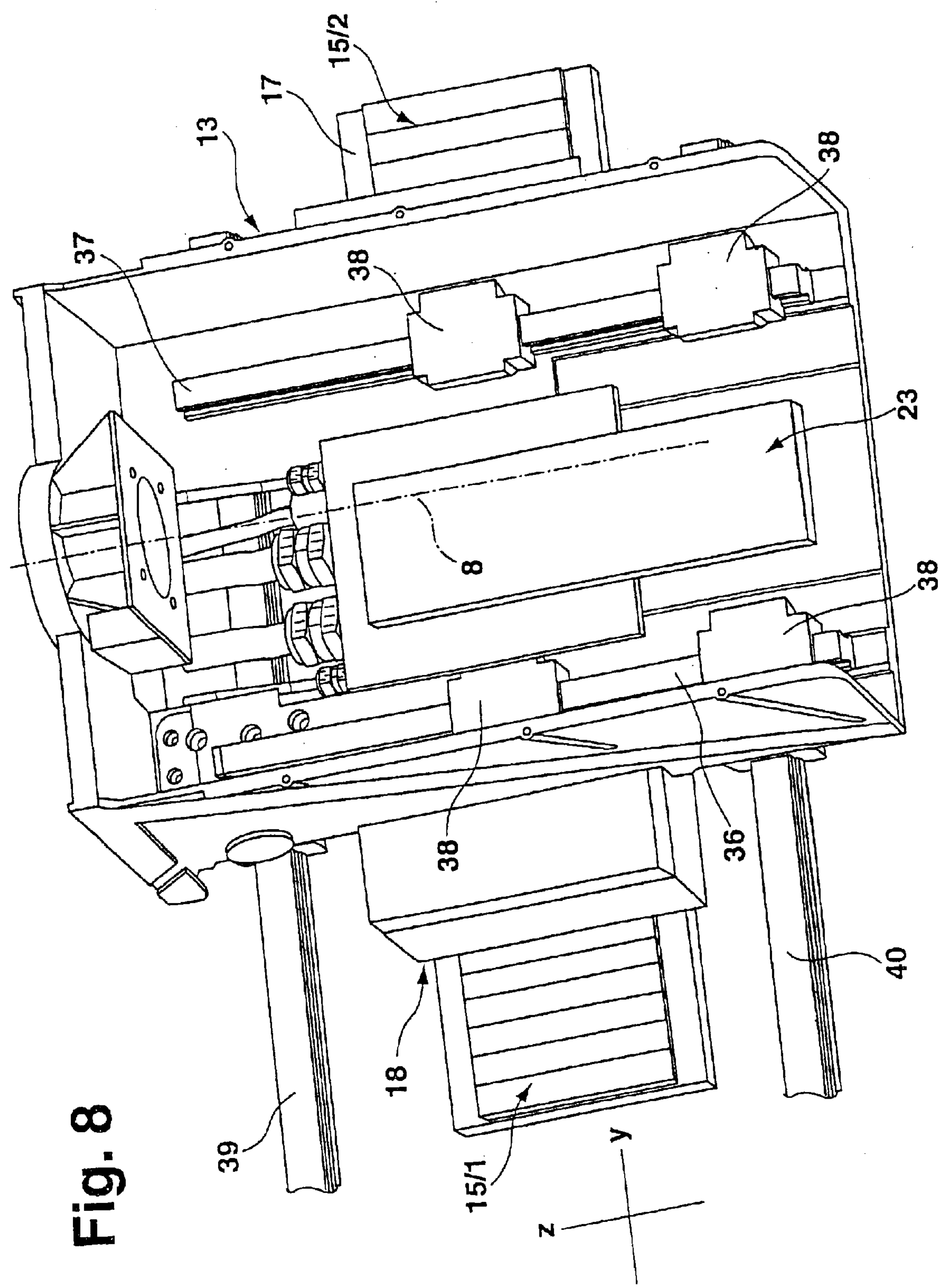
FIG. 8 shows the assembly of FIG. 7 together with the housing of a directional carriage.
Figure 9:
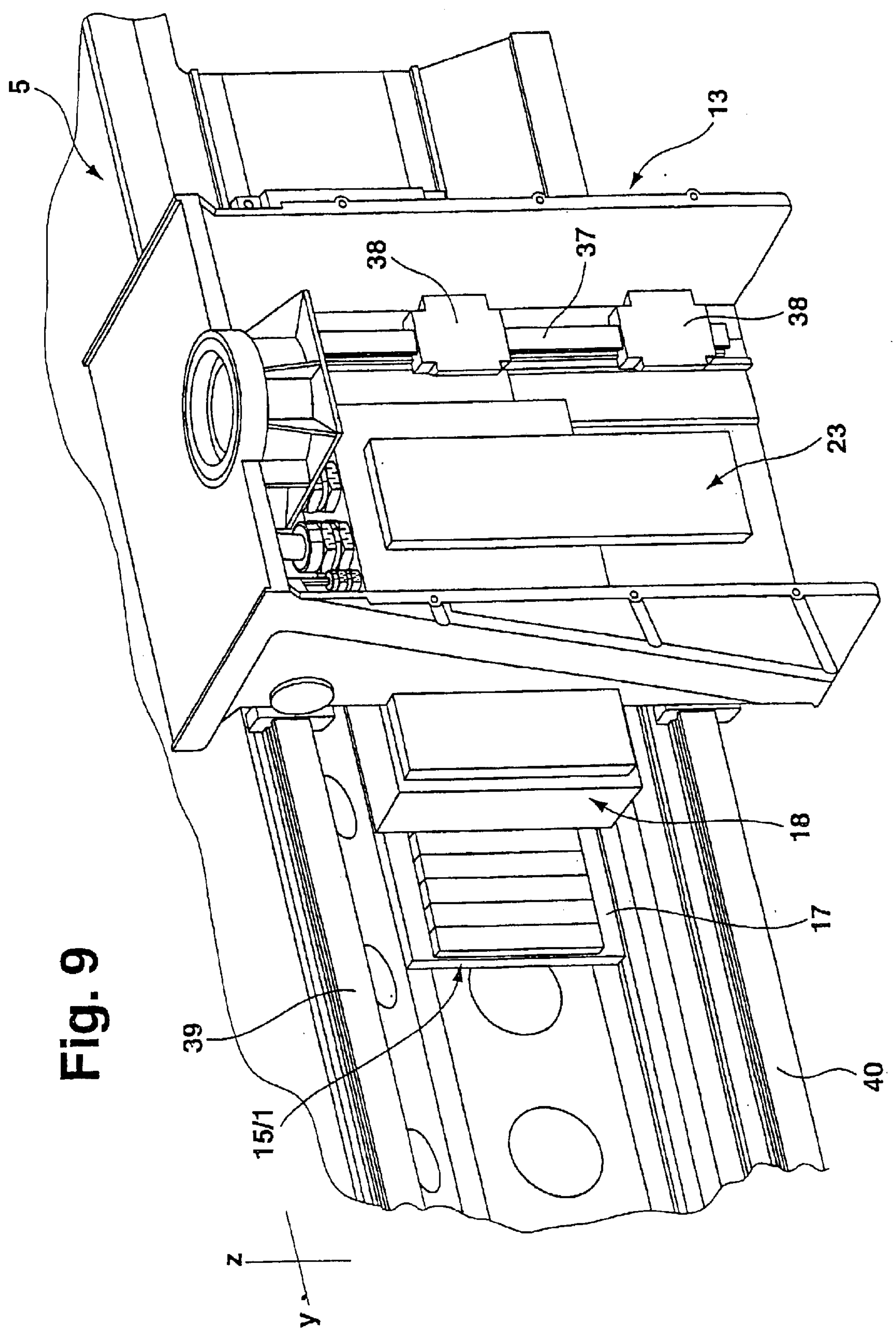
FIG. 9 is a fragmentary perspective view of the assembly of FIG. 8 mounted on the bridge as shown in FIG. 1.

The directional carriage 13 is illustrated in detail in FIGS. 8 and 9. As shown, the carriage 13 is designed as a housing that surrounds the laser cutting head 6 with the secondary element 23 (not illustrated) on four sides. The dot-dash line in FIG. 8 indicates the axis of the laser beam 8. With the primary elements 19/1, 19/2 of the linear motors 21, 22 positioned in the y-direction on both sides of the primary element 20 of the linear motor 24, and with the axis of the laser beam 8 extending at the level of the center of the primary element 20, the power fed to the linear motors 21, 22 is applied in symmetrical fashion relative to the axis of the laser beam 8. This helps maintain a constant, highly precise alignment of the laser beam 8 emanating from the laser cutting head 6 and impinging on the metal plate 9.

With the aid of the drive system components described, the laser cutting head 6 (i.e. the laser beam emitted by it) can be moved to any desired spot on the metal plate 9 to be processed. The movement of the laser cutting head 6 in the direction of the z-axis is primarily intended for adjusting the machine to accommodate the thickness of the workpiece to be cut. Accordingly, the travel path of the laser cutting head 6 in the direction of the z-axis is substantially shorter than the travel path of the combination of carriage 13 and laser cutting head 6 in the direction of the y-axis.

Thus, it can be seen from the foregoing detailed specification and attached drawings that the novel drive assembly is compact and enables facile processing of workpieces.

Having thus described the invention, what is claimed is:

1. In a machine tool with an operating unit (6) that can be moved by at least one first linear motor (24) along a first guide structure (13) in the direction of a first axis of travel (z-axis) and by at least one second linear motor (21, 22) jointly with the first guide structure (13) along a second guide structure (5) in the direction of a second axis of travel (y-axis), each linear motor (21, 22, 24) including a primary element (19/1, 19/2, 20) as well as a secondary element (15/1, 17; 15/2, 17; 23), the improvement wherein (i) the secondary element(s) (23) associated with the first axis of travel (z-axis) is/are operatively connected to the operating unit (6); (ii) the secondary element(s) (15/1, 17; 15/2, 17) associated with the second axis of travel (y-axis) is/are operatively connected to the second guide structure (5); (iii) the primary elements (19/1, 19/2, 20) associated with the different axes of travel (y-axis, z-axis) are operatively connected to the first guide structure and are positioned between the secondary elements (23) associated with the first axis of travel (z-axis) and the secondary elements (15/1, 17; 15/2, 17) associated with the second axis of travel (y-axis); (iv) the primary elements (19/1, 19/2, 20) associated with the different axes of travel (y-axis, z-axis) are arranged in a linear side-by-side array in the direction of one axis of travel (y-axis) while mutually overlapping in the direction of the other axis of travel (z-axis); and (v) said primary elements (19/1, 19/2, 20) associated with the different axes of travel (y-axis, z-axis) are mutually offset and mutually overlapping in the direction perpendicular to the operating plane defined by the axes of travel (y-axis, z-axis) of the operating unit (6), while the primary element(s) (19/1, 19/2, 20) associated with an axis of travel (y-axis, z-axis) opposite the other primary element(s) (19/1, 19/2, 20) is/are positioned towards the matching secondary elements (15/1, 17;, 15/2, 17; 23).

2. The machine tool in accordance with claim 1 wherein the primary elements 19/1, 19/2, 20) associated with the different axes of travel (y-axis, z-axis) overlap in full mutual superposition in the direction of said first axis of travel (z-axis).

3. The machine tool in accordance with claim 1 wherein the primary elements (19/1, 19/2, 20) associated with the different axes of travel (y-axis, z-axis) are arranged in a linear side-by-side array in the direction of the second axis of travel (y-axis) while mutually overlapping in the direction of the first axis of travel (z-axis).

4. The machine tool in accordance with claim 1 wherein the joint movement of the operating unit (6) and the first guide structure (13) in the direction of the second axis of travel (y-axis) an even number of multiple linear motors (21, 22) is provided and that in the direction of the axis of travel concerned (y-axis), the primary elements (19/1, 19/2) of these linear motors (21, 22) are evenly distributed on both sides of the primary element(s) (20) associated with the first axis of travel (z-axis).

5. The machine tool in accordance with claim 1 wherein each of the primary elements (19/1, 19/2, 20) associated with the different axes of travel (y-axis, z-axis) is provided with a partial housing compartment (18/1, 18/2, 18/3) and that together these housing compartments form a modular primary element housing (18) is equipped with at least one common port (32, 33, 34, 35) shared by several primary elements (19/1, 19/2, 20) and accommodating at least one external power supply cable, the leads of at least one external monitoring circuit and the leads of at least one external control circuit.

6. The machine tool in accordance with claim 1 wherein a primary element housing (18) is equipped with at least one common port (32, 33, 34, 35) shared by several primary elements (19/1, 19/2, 20) and accommodating at least one of the components selected from the group consisting of at least one power supply cable (26), at least one coolant feed line (28), and the leads of at least one temperature monitoring circuit (30).

7. The machine tool in accordance with claim 1 wherein said machine tool is a laser cutting machine with a laser cutting head as the operating unit (6).

* * * * *